US010002438B2

United States Patent
Pollard et al.

(10) Patent No.: US 10,002,438 B2
(45) Date of Patent: Jun. 19, 2018

(54) RAPID IMAGE REGISTRATION

(71) Applicant: Hewlett-Packard Development Company, L.P., Houston, TX (US)

(72) Inventors: Stephen Pollard, Bristol (GB); Robert Ulichney, Stow, MA (US); Matthew D Gaubatz, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 7 days.

(21) Appl. No.: 15/327,959

(22) PCT Filed: Jul. 22, 2014

(86) PCT No.: PCT/US2014/047681
§ 371 (c)(1),
(2) Date: Jan. 20, 2017

(87) PCT Pub. No.: WO2016/014041
PCT Pub. Date: Jan. 28, 2016

(65) Prior Publication Data
US 2017/0206671 A1    Jul. 20, 2017

(51) Int. Cl.
*G06K 9/36* (2006.01)
*G06T 7/37* (2017.01)

(52) U.S. Cl.
CPC ...... *G06T 7/37* (2017.01); *G06T 2207/20024* (2013.01); *G06T 2207/20056* (2013.01)

(58) Field of Classification Search
CPC ................ G06T 2207/20056; G06T 7/37
See application file for complete search history.

(56) References Cited

U.S. PATENT DOCUMENTS

| | | |
|---|---|---|
| 6,282,300 B1 | 8/2001 | Bloom et al. |
| 6,408,082 B1 | 6/2002 | Rhoads et al. |
| 2003/0228030 A1 | 12/2003 | Wendt |
| 2006/0233420 A1 | 10/2006 | Rhoads |
| 2008/0273861 A1 | 11/2008 | Yang et al. |
| 2010/0121183 A1* | 5/2010 | Taguchi ............... A61B 6/5264 600/427 |
| 2013/0142396 A1 | 6/2013 | Fletcher et al. |
| 2013/0163896 A1 | 6/2013 | Chen et al. |
| 2017/0046852 A1* | 2/2017 | Gadi ...................... G06K 9/00 |

FOREIGN PATENT DOCUMENTS

| | | |
|---|---|---|
| JP | 2003-521149 A | 7/2003 |
| KR | 10-0753490 B1 | 8/2007 |

OTHER PUBLICATIONS

Alattar, A.M. et al, "Watermark Re-synchronization using Log-polar mapping of image autocorrelation", May 27, 2013.

* cited by examiner

*Primary Examiner* — Phuoc Tran
(74) *Attorney, Agent, or Firm* — Trenner Law Firm, LLC (57) ABSTRACT

An example method of rapid image registration includes recovering an affine transform of a quasi-periodic object based on peak locations of Discrete Fourier Transform (DFT) in a captured image. The example method also includes filtering a region of the captured image to match a filtered version of a reference image including the quasi periodic object. The example method also includes recovering translation parameters to reduce image differences between the reference image and the captured image for a subset of the image locations of the filtered image and outputting an approximate transform including translation.

15 Claims, 7 Drawing Sheets

Fig. 5a

RAPID IMAGE REGISTRATION

BACKGROUND

Imaging modules are no longer limited to desktop scanners or high end cameras. Quality imaging modules are now available in a wide variety of stand-alone and handheld or mobile devices (e.g., a mobile phone with a high resolution camera module). As the quality and resolution of these imaging modules continues to improve, the captured images include more clearly delineated individual dots of printed halftone images or other patterns. As such, the imaging modules in mobile devices may be sufficient to recover information represented in the image by modulating the position of individual halftone dots. However, the user often holds the mobile device (and hence the camera module) in a non-frontoplanar orientation relative to the image being captured, which can result in a distorted image.

BRIEF DESCRIPTION OF THE DRAWINGS

FIG. 3b is an example magnitude plot of a Fourier transform (shown as an inverted log plot to illustrate weaker higher frequency components) of the example halftone screen shown in FIG. 3a.

DETAILED DESCRIPTION

An initial processing step, before being able to automatically recover information or embedded data from a captured image, is to register the captured image. After registering the captured image, embedded data represented in the structure of the image (e.g., Stegatones) can be recovered from the modulation of the position of the individual printed halftone dots.

Systems and methods of rapid image registration are disclosed. In an example, a computer-implemented process recovers initial affine approximations from the shifted positions of the characteristic peaks in the frequency domain to recover parameters of the transformation directly from structure of the image. Example parameters recovered by the affine transform may include one or more of a combination of scale, aspect ratio, rotation and skew, but does not explain all the distortion due to the planar projection. The a computer-implemented process may then fix parameters to initiate a gradient descent based on a coarse representation of the mule image (e.g., using low-pass filtering). The local minima of the optimization of translation parameters are close to global minima (e.g., the cost function being the difference in the low-pass filtered versions of the mule and the captured image). The a computer-implemented process may then relax parameters of the planar projection to register and rectify the image.

In an example, the first and second stages of this process can be implemented by the computer-implemented process based on a central (e.g., 256×256 pixel) region of the captured image to achieve rapid performance (between 12 and 15 frames per second using a 2 MP web-camera connected to a PC). The computer-implemented process may then operate on a sub-region of the (now known) region covered by the whole of the quasi periodic pattern to be processed.

The computer-implemented techniques described are based on the structure of the discrete Fourier transform (DFT) of a periodic pattern, which can be used to recover at least some distortion parameters, and then proceed to recover the remaining translation keeping these fixed. In an example, all but the final stages of processing are based on analysis of the same sub-window which results in an efficient and effective approach.

The system and method disclosed herein can be implemented by a computer-implemented process to directly, robustly, and quickly compute affine approximation(s), thus simplifying image registration in a captured image. The captured image does not have to be rectangular.

Before continuing, it is noted that as used herein, the terms "includes" and "including" mean, but is not limited to, "includes" or "including" and "includes at least" or "including at least." The term "based on" means "based on" and "based at least in part on."

Figure 1:
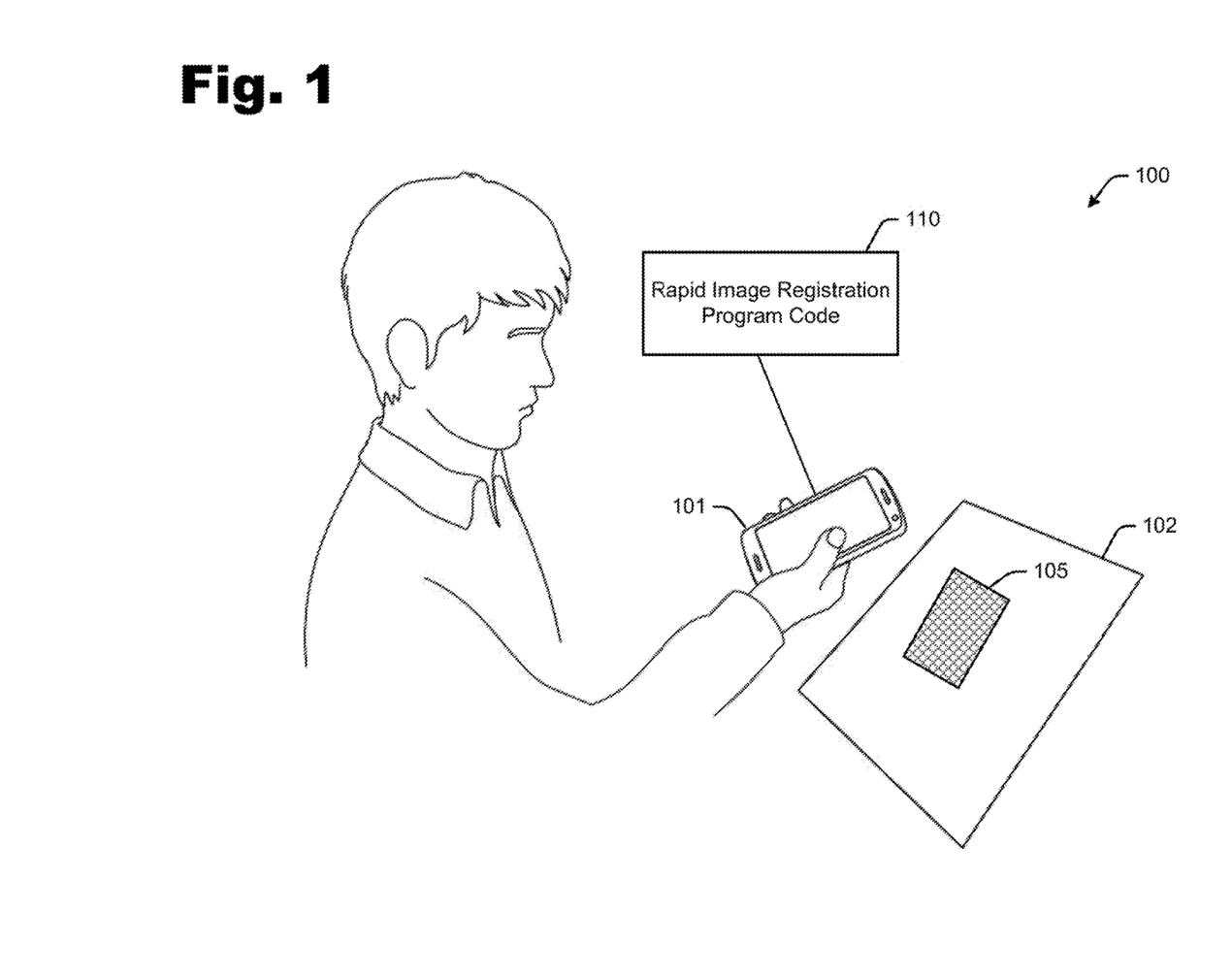
FIG. 1 is a high-level block diagram of an example system which may be implemented for rapid image registration.

FIG. 1 is a high-level block diagram of an example system 100 which may be implemented for rapid image registration. In an example, the system 100 may be associated with a mobile device 101 for capturing a video or still image of a paper 102. The image may include a quasi-periodic, two-dimensional object 105. The quasi-periodic, two-dimensional object 105 may be an embedded data-bearing object, such as a data-bearing halftone structure (e.g., a Stegatone).

Using a hand-held mobile device 101 to capture an image from the paper 102 may result in distortion, as illustrated in FIG. 1. Due to the orientation the camera in a mobile device 101 relative to the object 105 to be captured in an image (e.g., caused by user holding the mobile device 101 adjacent the paper 102), the captured image often suffers from perspective distortion. This result is often the case, even if the paper 102 is sufficiently flat, because it is difficult for the user to hold the mobile device 101 with the camera perfectly parallel to the paper 102. Any out of plane rotation may result in a distorted captured image.

The mobile device 101 may execute a computer-implemented process which includes rapid image registration program code 110, e.g., before recovering embedded data from the captured image. In an example, the program code may be executed to estimate parameters of a planar projection matrix (or homography) that relates the image captured by the mobile device 101, to a coordinate frame of the original object 105, and thus recover a transform of the captured image. The recovered transform can then be input to reconstruct and output a rectified image that is free from perspective distortion (e.g., properly orientated), while maintaining the correct scale (e.g., aspect ratio) of the captured image. Having a rectified image simplifies the task of recovering data that may be represented by the captured image.

The system 100 may include a machine-readable storage medium and a processor (e.g., on the mobile device 101) capable of storing and executing the rapid image registration program code 110 to implement the computer-implemented process described herein. The processor may be a central processing unit (CPU), a semiconductor-based microprocessor, or any other device suitable for retrieval and execution of instructions. As an alternative or in addition to fetching, decoding, and executing instructions, the processor may include one or more integrated circuits (ICs) or other electronic circuits that comprise a plurality of electronic components for performing the functionality described below. The functionality may be performed by multiple processors.

The processor may communicate with the machine-readable storage medium. The machine-readable storage medium may be any suitable machine readable medium, such as an electronic, magnetic, optical, or other physical storage device that stores executable instructions or other data (e.g., a hard disk drive, random access memory, flash memory, etc.). The machine-readable storage medium may be, for example, a computer readable non-transitory medium configured to store the rapid image registration program code 110.

Figure 2:
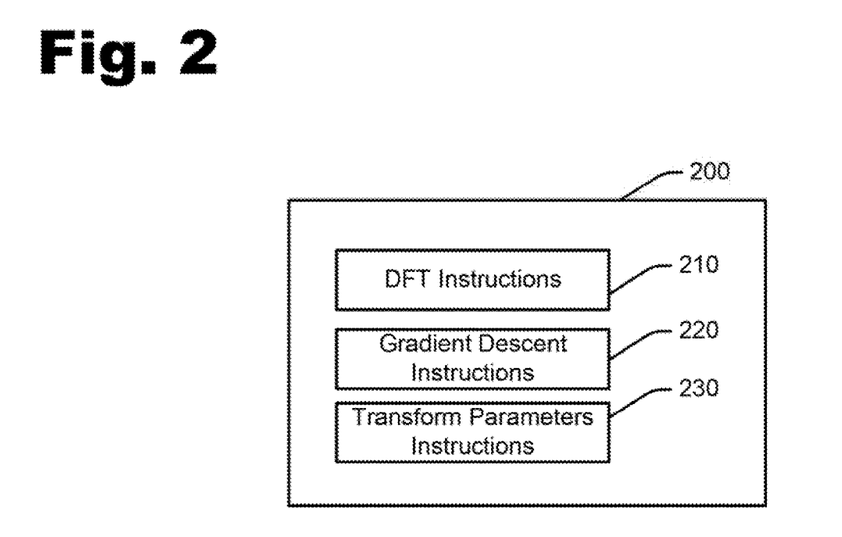
FIG. 2 shows an example architecture of machine readable instructions, which may be executed for rapid image registration.

Instructions of the rapid image registration program code 110 implement the computer-implemented process of the system can be better understood with reference to FIG. 2 and the following discussion of various example functions of the rapid image registration program code 110.

FIG. 2 shows an example architecture of machine readable instructions 200, which may be executed for rapid image registration. In an example, the rapid image registration program code 110 discussed above with reference to FIG. 1 may be implemented as machine-readable instructions 200 (such as but not limited to, software or firmware). It is noted, however, that the architecture shown in FIG. 2 is provided only for purposes of illustration of an example operating environment, and is not intended to limit implementation of the program code.

During operation, the processor executes the function of the machine readable instructions 200 as self-contained modules to perform the computer-implemented process. These modules can be integrated within a self-standing tool, or may be implemented as agents that run on top of an existing application. In an example, the architecture of machine readable instructions may include Discrete Fourier Transform (DFT) peak point determination instructions (or "DFT instructions") 210, gradient descent instructions 220, and transform parameters instructions 230.

DFT instructions 210 may include instructions to determine peak points in the magnitude of a DFT of an image, such as an image captured by a camera or a scanner, with frequency values associated with peaks compared to surrounding areas. A peak point may be relative to a particular area. For example, there may be two peak points identified where one of the peak points has a greater value than the other. In one implementation, the half plane of the DFT is analyzed for peak points, and peak points in corresponding frequency ranges on a second half plane are assumed based on peak points within the analyzed half plane.

In an example, initial affine approximations are recovered from the shifted positions of the characteristic peaks in the frequency domain to recover parameters (e.g., a combination of scale, aspect ratio, skew and rotation) of the transformation directly from structure of the image.

Gradient descent instructions 220 may include instructions to fix these parameters and initiate a gradient descent based on a coarse representation of the mule image (e.g., using low-pass filtering). The local minima of the optimization of translation parameters are close to global minima (e.g., the cost function being related to the difference in the low-pass filtered versions of the mule and the captured image).

The parameters of the planar projection are then relaxed to register and rectify the image. Transform parameters instructions 230 may include instructions to generate and output information about the image, such as to transmit, store, or display information about the orientation of the quasi-periodic two-dimensional object. In an example, the processor may be executed to output a rectified image.

In an example, the machine-readable storage medium may include additional instructions, such as instructions to determine characteristics of the image of the quasi-periodic two dimensional object, if the presence of a quasi-periodic two dimensional object is indicated. For example, the processor may determine the object scale, camera distance, camera focus, object orientation, or other information. In an example, the processor may determine characteristics of the quasi-periodic object based on the DFT.

It is noted that additional properties of the captured image may also be analyzed, in addition to the DFT, to determine further characteristics of the captured image. In an example, the captured image is analyzed to determine if sufficient information is provided by the quasi-periodic two-dimensional object for the underlying or embedded data associated with the object to be analyzed. For example, if the quality of the image is below a threshold, the processor may determine not to analyze the quasi-periodic, two-dimensional object to decode it. Information may be displayed or otherwise provided to the user related to the presence of the object and the quality of the capture. The user may then recapture an image for the processor to analyze to determine if the image of the recaptured image is of sufficient quality.

Before continuing, it should be noted that the system described above is provided for purpose of illustration, and is not intended to be limiting. Other devices and/or device configurations, as well as program code architecture(s) may be utilized to carry out the operations described herein.

The computer-implemented process may be better understood with reference to the following example functions.

The computer-implemented process may recover the projective transform or homography that relates the rectified image coordinates to the distorted counterparts to remove the projective distortion from the perspective image of a plane. In homogeneous coordinates, this transform can be represented as a 3×3 matrix, H, as follows:

$$\begin{pmatrix} x' \\ y' \\ w' \end{pmatrix} = \begin{bmatrix} h_{11} & h_{12} & h_{13} \\ h_{21} & h_{22} & h_{23} \\ h_{31} & h_{32} & h_{33} \end{bmatrix} \begin{pmatrix} x \\ y \\ w \end{pmatrix} = \begin{bmatrix} A & t \\ v^T & 1 \end{bmatrix} \begin{pmatrix} x \\ y \\ w \end{pmatrix}$$

The transform may also be represented more simply as x'=Hx, where finally the transformed image locations are given by x"=x'/w' and y"=y'/w'. Note that the planar homography is the most general form of this transformation, and that the homography can be represented as being composed from affine A (2×) and translation (t) when the elements of v are zero.

For purposes of illustration, consider data-bearing images that have an array of symbols (usually simple dots) on a two-dimensional periodic structure. Data may be embedded by means of perturbations on elements in the periodic structure. In the case of Stegatones the periodic structure depicts an image, and the symbols are the halftone dots. For other applications (e.g., grid codes) there is no image depicted by the structure.

In the case of Stegatones, for example, the image used by the computer-implemented process to construct the halftone pattern may be known at decode time, or advantageously for some applications, the data may be embedded in an unknown image (this is called a mule-less Stegatone). The two-dimensional structure may be a fixed size small enough to always fit inside the field of view of the camera or may extend over a larger region with a repeating code that can be recovered from a capture-window-sized region of interest. In an example, the computer-implemented process is applicable where the mule image (e.g., default halftone) is known to the recovery process (as is often the case).

Figure 3A:
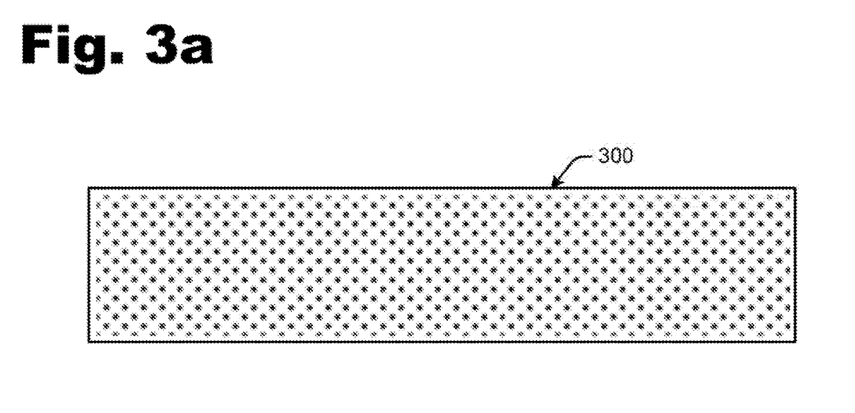
FIG. 3a shows an example of a halftone screen.
Figure 3B:
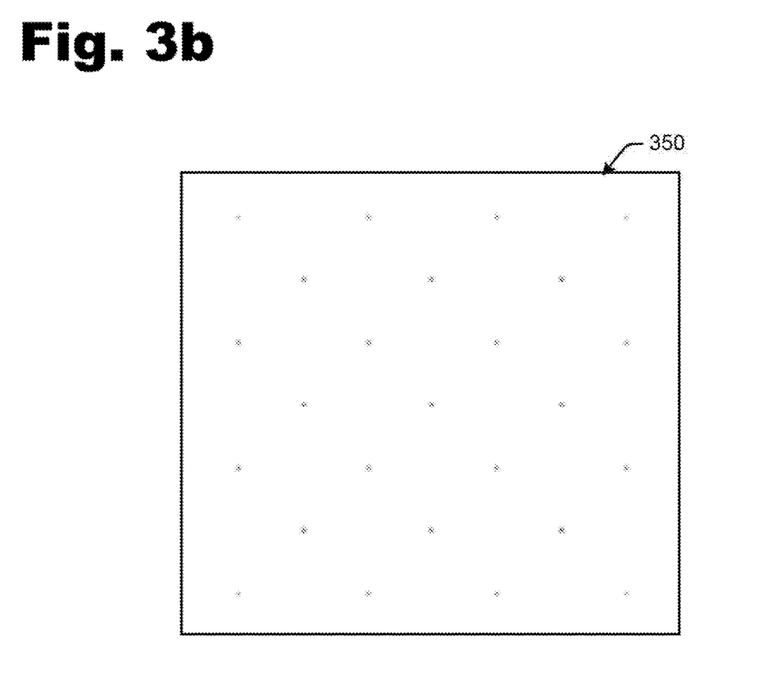

FIG. 3a shows an example of a halftone screen 300. FIG. 3b shows an example magnitude plot 350 of the Fourier transform (shown as inverted log to illustrate weaker higher frequency components) of the halftone screen shown in FIG. 3a. For purposes of illustration, consider a monochrome 45 degree clustered-dot halftone screen with a cell period of 150 cells per inch (when printed at 600 dots per inch; dpi) in each of the horizontal and vertical directions (referred to as a 106.1 line per inch (or "lpi")) screen as the spacing is measured in the 45 degree screen direction. An example of the regular structure of this screen 300 is shown in FIG. 3a for a 12.5% uniform grey level (e.g. value 224 out of a range 0 to 255).

The example screen 300 is a monochrome clustered-dot half-toning screen, and is the same structure used on data-bearing halftones, or Stegatones. While described for purposes of illustration, it is noted that the techniques described herein are applicable to other screens.

FIG. 3b shows an example magnitude plot 350 of the Fourier transform (shown as an inverted log plot to illustrate weaker higher frequency components) of the 45 degree halftone screen 300 shown in FIG. 3a. Computing the discrete Fourier Transform (DFT) of a patch of the 12.5% grey halftone pattern shown in FIG. 3a, and examining its magnitude (as shown in the plot 350 in FIG. 3b), reveals that the fundamental frequencies of the halftone pattern along the 45 degree directions are strongly visible as a set of 4 peaks surrounding the DC (at the center of the DFT). Also evident are a number harmonics repeated toward the boundary of the baseband. This structure of the DFT is strongly preserved when the halftone depicts image content, even where the structure of the halftone has been "disturbed," e.g., to create a Stegatone.

Figure 4A:
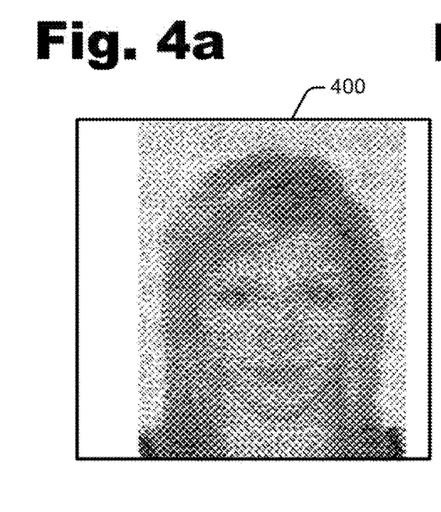
FIGS. 4a-b show (a) an example digital bitmap image of a Stegatone, and (b) corresponding example magnitude plot of the Fourier transform of the image in FIG. 4a highlighting fundamentals as dots.
Figure 4B:
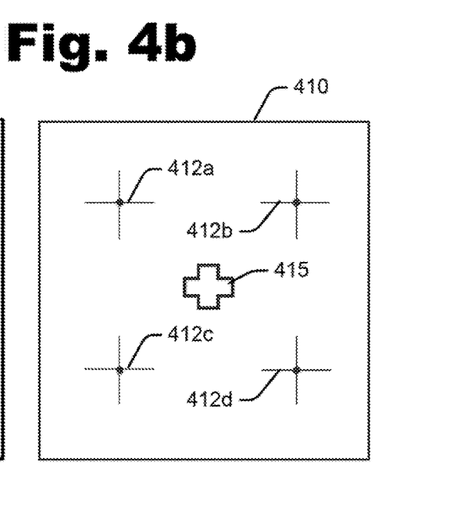
Figure 4C:
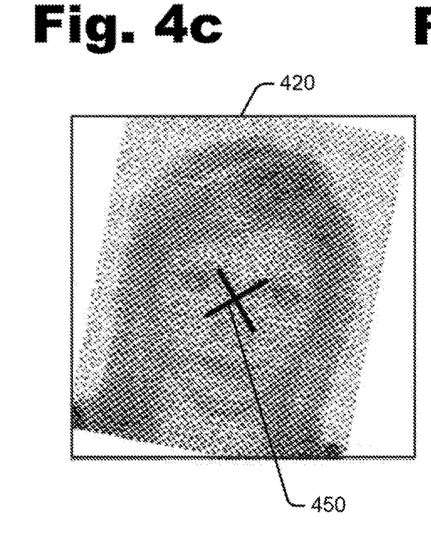
FIGS. 4c-d show (c) an example region of a target image of the digital bitmap image in FIG. 4a captured with perspective distortion, and (d) corresponding example magnitude plot of the Fourier Transform of the image in FIG. 4c highlighting fundamentals as dots.
Figure 4D:
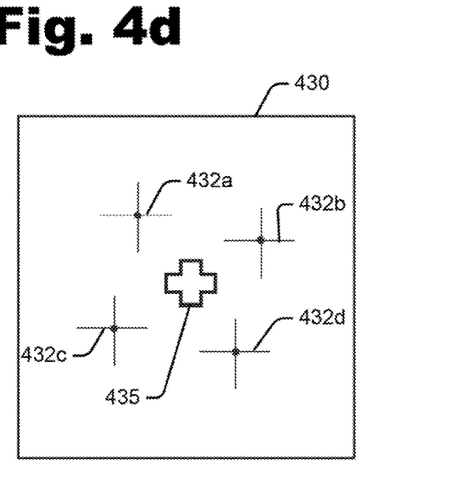

FIGS. 4a-b show (a) an example digital bitmap 400 of a Stegatone (e.g., 400×400 pixels square), and (b) corresponding example magnitude plot 410 of the Fourier transform highlighting fundamentals 412a-d using dots. Each cell in the original digital halftone is 4×4 pixels, with many of the cells shifted to represent information. FIGS. 4c-d show (c) an example region of an image 420 captured using a 2 mega pixel camera (e.g., 600×600 pixels square), and (d) corresponding example magnitude plot 430 of the Fourier Transform of the central 256×256 region of the captured image highlighting fundamentals 432a-d using dots.

With reference to FIGS. 4a and 4c, Stegatones are clustered-dot halftone images where data is embedded in individual dot clusters by means of small shifts of those dot clusters, which are logically contained in cells. It should be noted that while described as applied to Stegatone images, the computer-implemented process described herein is applicable to other examples. In an example, the technique is applied to images that will be analyzed for recognition tasks. The technique may also applied to enhanced images for easier interpretation.

As shown in FIGS. 4b and 4d, the amplitude of the discrete Fourier transform (DFT) applied to the captured image 420 exhibits strong spikes (412a-d and 432a-d) that correspond to the underlying periodic structure. These spikes are a result of the perturbations being considerably smaller than the period.

A halftone threshold array for Stegatones is a 45-degree screen. The result is dot patterns that are arranged in a checkerboard pattern. If such a halftone is captured with no distortion, the fundamental frequency spikes are arranged in a rectangle (actually a square) with side perpendicular to the spatial frequency axes, and the DC term in its center, as shown in FIG. 4b.

In practice, however, the captured Stegatone may be distorted due to the inaccuracies of holding a mobile capture device by hand. Again, FIG. 1 shows an example of a mobile camera capturing a printed Stegatone. The effect can be seen by comparing the plot 410 in FIG. 4b (of the original digital bitmap shown in FIG. 4a), with the plot 430 in FIG. 4d (of the captured image shown in FIG. 4c).

The first step in the computer-implemented process for recovering a rectified image (e.g., corresponding to digital bitmap 400) from captured image 420, is to identify the presence of these spikes 432a-d in the captured image. These spikes 432a-d in the captured image 420 indicate the presence of the mark, and indicate an estimated affine transform that approximates the projection.

In an example, the spikes 432a-d are easier to identify in the plot 430 by disregarding a region near the DC (sum) term that dominates the DFT. For example, a mask 415, 435 may be applied to the plot. The DC term represents the average of the entire image, and the values next to it represent the largest scale features of the image. Therefore, care should be used to mask the DC region. The mask 415, 435 should not be too small, as this may allow leakage of large DC-related values. The mask 415, 435 should not be too large, as this may hide the sought after fundamental frequencies.

In this example the computer-implemented process may block the DC area with a "plus-sign" shaped mask. However, other shapes (e.g., a disk-shaped mask) can also serve this purpose. After masking, the largest remaining values are the four spikes 412a-d and 432a-d that correspond to the halftone screen in the Stegatone. In the example shown in FIG. 4b, these spikes 412a-d form a perfect square. In the example shown in FIG. 4d, these spikes 432a-d are affine distorted due to the distortion of the captured image. In other examples, the mask may act more like a filter, composed of values that attenuate the frequency components by an amount related to their distance to the DC.

The affine transforms in the spatial and frequency domains are related. Therefore, the affine approximation to the image transform can be recovered directly from the relocation of the fundamental peaks in the captured image relative to their original expected locations. For illustrative purposes, the recovered affine transform is used to transform the 45 degree screen directions at the center of the Stegatone 450.

The computer-implemented process may then recover the affine components of the transform from the relative displacement of the fundamentals. An affine transform measured in the DFT is related to that in the image space as:

$$A_I = (A_{FT}^{-1})^T$$

In the above equation, $A_I$ and $A_{FT}$ are the 2×2 affine transforms in the image and Fourier domains, respectively. $A_{FT}$ can be solved by identifying the corresponding locations of a pair of fundamentals between the target image (FIG. 4a) and captured image (FIG. 4c).

The magnitude of the Fourier Transform is symmetric with respect to the location of the DC, and thus appropriate pairs of fundamentals describe all four locations, the estimation of which is referred to herein as the AffineDFT method. In addition, in those cases where the actual transform includes planar perspective components, the AffineDFT method provides a reasonable approximation to the local planar homography at the center of the region covered by the DFT, as follows:

$$x' = \begin{pmatrix} x' \\ y' \\ w' \end{pmatrix} = \begin{bmatrix} A_I & 0 \\ 0 & 1 \end{bmatrix} \begin{pmatrix} x \\ y \\ w \end{pmatrix} = H_A x$$

It is possible to vary the size of the central region of the captured image over which the DFT is computed. In each case the recovered affine transform is an approximation to the actual planar projection over the transformed region. Larger regions provide more accurate approximations to the affine transform as the location of the peaks in the DFT can be determined more accurately. However the computational cost also rises with the size of the region. In an example, a 256×256 region provides a good compromise between computational efficiency and accuracy of the local approximate affine transform.

The same 256×256 central region of the captured image is used to recover the approximate translation of the known mule image. As the initial approximation (e.g., where the centers of the mule and captured images coincide) may be some considerable distance (e.g., a large fraction of the size of the mule image) from the actual translation, a coarse (e.g., low-pass filtered version) representation of the mule and captured images may be used for recovering the approximate translation. This goal can be achieved using Gaussian smoothing or advantageously using block averaging or integral images as these can be computed rapidly and independently of the size of the low-pass filter.

Figure 5A:
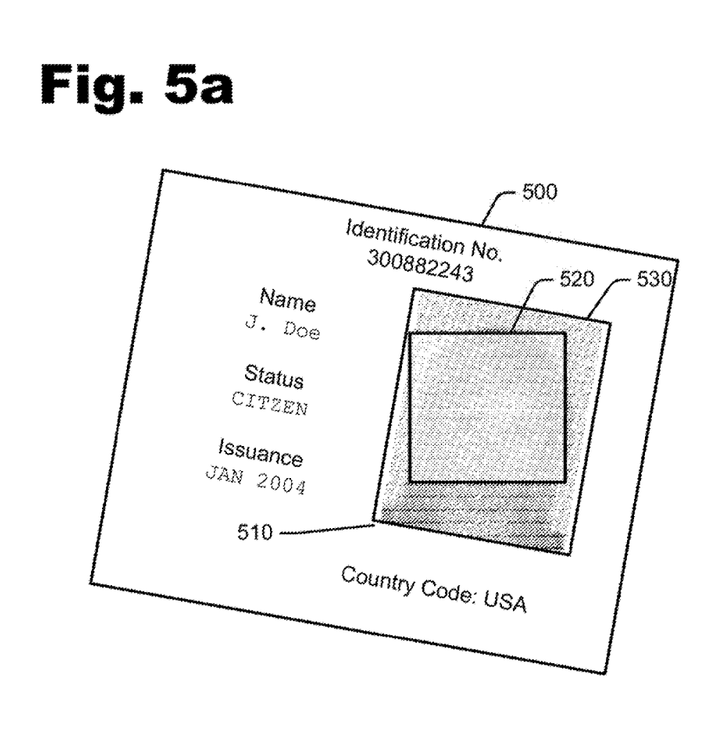
FIGS. 5a-c show (a) an example captured image (b) corresponding example magnitude plot of a Fourier transform illustrating affine distortion, and (c) an example filtered image.
Figure 5B:
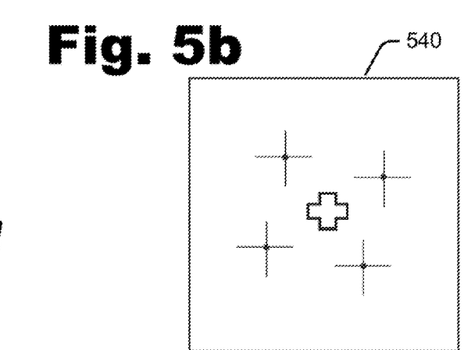
Figure 5C:
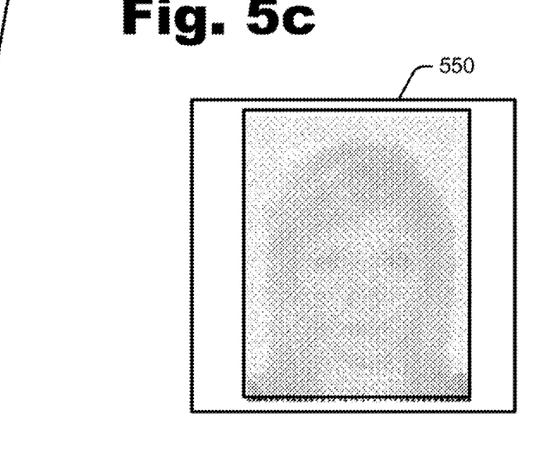

FIGS. 5a-c show (a) an example image 500 captured with a two megapixel (MP) camera, (b) an example plot 540 showing corresponding output of the DFT showing the affine distortion, and (c) an example low-pass filtered mule image 550 filtered with a 31×31 pixel block average filter. For purposes of illustration, the image 510 being analyzed by the computer-implemented process is an identification photo, which may include embedded data (e.g., for security purposes). It is noted, however, that the techniques described herein are not limited to use with any type of image capture operations.

The scale, S, recovered by the computer-implemented process from the affine transform, is input to determine the low-pass filter applied to the central region 520 of the captured image (as shown in the figure). That is, while the mule image was filtered with a 31×31 block filter the central region is filtered using an equivalent 31S×31S block filter. A gradient descent calculation then proceeds to optimize the translation parameters of the transform to minimize the sum squared intensity differences between the captured and mule images. In this illustration, a 10×10 grid of x, y locations is defined over the central region 520 of the image 510 to be analyzed. The affine parameters are fixed and only translation is updated at each step to improve the robustness and enable an approximate translation to be recovered in near real time.

The recovered transformation (e.g., affine+translation) is illustrated by the outline 530 in FIG. 5a. While the figure only shows rotation and scale of 530, it is often also skewed to better approximate the true planar projective transform. The remaining slight discrepancy is due to the un-modelled planar projection (that is recovered at step 3).

The transformation can be better understood by the following illustration. For a symmetrical 45 degree halftone pattern with a horizontal and vertical period of M (e.g., 8 pixels) dots/pixels per cycle (or a cell size of M/2), the horizontal and vertical frequency is P/M cycles per inch. P is the print resolution in dots/pixels per inch (e.g., 400 or 600 dpi) and the line frequency is $\sqrt{2}P/M$.

If N×N is the size of DFT representing the frequency content of the image, then for an undistorted halftone the four fundamentals are displaced from the DC by d=N/M in both the horizontal and vertical directions.

Consider just the two fundamentals in the top half of the DFT (−d, d) and (d, d) and their counterparts in the top half of the DFT of the captured image $(u_1, v_1)$ and $(u_2, v_2)$. The affine parameters of the transformation that take the locations in the DFT of the undistorted halftone to that of the captured image (coordinates with a dash) can be represented as follows:

$$\begin{bmatrix} x' \\ y' \end{bmatrix} = \begin{bmatrix} a_1 & a_2 \\ a_3 & a_4 \end{bmatrix} \begin{bmatrix} x \\ y \end{bmatrix}$$

Solving for the transformation of the two fundamentals in the DFT yields:

$$a_1 = (u_1 + u_2)/2d$$

$$a_2 = (u_2 - u_1)/2d$$

$$a_3 = (v_1 + v_2)/2d$$

$$a_4 = (v_2 - v_1)/2d$$

The computer-implemented process can use these equations to obtain the affine parameters in the image space (which is the transpose of the inverse), as follows:

$$A_I = \frac{1}{a_1 a_4 - a_2 a_3} \begin{bmatrix} a_1 & -a_3 \\ -a_2 & a_4 \end{bmatrix}$$

Given the four affine parameters $(a_1, a_2, a_3, a_4)$, the scale in the x and y directions are expressed by:

$$S_x = \sqrt{a_1^2 + a_2^2} \text{ and } S_y = \sqrt{a_3^2 + a_4^2}$$

The computer-implemented process can approximate the combined scale as the mean or RMS of these two equations.

Gradient descent (e.g., a Gauss-Newton or Quasi Gauss-Newton non-linear least squares iterative minimization) image registration updating translation can be derived mathematically by the computer-implemented process. The computer-implemented process finds a transformation that minimizes the sum square difference (SSD) between a reference and a target image for a set of image locations defined with respect to the reference image. This relationship can be expressed as:

$$\Sigma_i[T(i:p)-R(i)]^2$$

In the equation above, R(i) is the value of the reference image at the $i^{th}$ location, and T(i:p) the corresponding value of the target image at the transformed location using the transform parameters p. The sum can be linearized as T(i:p+Δp), with the object of finding a value of Δp that improves the revised SSD, and iterates as follows:

$$\sum_i \left[T(i:p) + \nabla T \frac{\partial W}{\partial p}\Delta p - R(i)\right]^2$$

In the equation above, $\nabla T = (\partial T/\partial x, \partial T/\partial y)$ is the gradient measured in the target image at the transformed location, and ∂W/∂p is the Jacobian of the warp parameters (transform) with respect to the x and y coordinates as follows:

$$\frac{\partial W}{\partial p} = \begin{pmatrix} \frac{\partial x}{\partial p_1} & \frac{\partial x}{\partial p_2} & \cdots & \frac{\partial x}{\partial p_n} \\ \frac{\partial y}{\partial p_1} & \frac{\partial y}{\partial p_2} & \cdots & \frac{\partial y}{\partial p_n} \end{pmatrix}$$

The total transform (including affine and translation parameters) can be represented as:

$$\begin{bmatrix} x' \\ y' \end{bmatrix} = \begin{bmatrix} a_1 & a_2 & t_1 \\ a_3 & a_4 & t_2 \end{bmatrix} \begin{bmatrix} x \\ y \\ 1 \end{bmatrix}$$

The above equation yields six parameters. In an example, only two of these parameters (t1, t2) are updated:

$$p=[a_1\ a_2\ t_1\ a_3\ a_4\ t_2]$$

Thus, the Jacobian of the affine transform A in x and y with respect to the parameters can be expressed as:

$$\frac{\partial A}{\partial p} = \begin{pmatrix} 0 & 0 & 1 & 0 & 0 & 0 \\ 0 & 0 & 0 & 0 & 0 & 1 \end{pmatrix}$$

The above equation is constant over the image. Therefore, the Jacobian for each measured location can be expressed as:

$$J_i = \nabla T \frac{\partial A}{\partial p} = [0\ 0\ T_x'\ 0\ 0\ T_y']$$

The total steepest descent direction can be expressed as:

$$[0\ 0\ \Sigma T_x'(T'-R)\ 0\ 0\ \Sigma T_y'(T'-R)]$$

In the above equations, T' is shorthand for the captured image value at affine transformed locations T(i:p), and $T_x'$ and $T_y'$ are the x and y image gradients $$\left(\frac{\partial T}{\partial x}, \frac{\partial T}{\partial y}\right)$$

at corresponding locations. The Gauss-Newton solution can be expressed as:

$$\Delta p = H^{-1}[0\ 0\ \Sigma T_x'(T'-R)\ 0\ 0\ \Sigma T_y'(T'-R)]$$

In the above equation, $H^{-1}$ is the Gauss-Newton approximation to the Hessian $H=\Sigma J_i^T J_i$, which can also be expressed as:

$$H = \begin{bmatrix} 0 & 0 & 0 & 0 & 0 & 0 \\ 0 & 0 & 0 & 0 & 0 & 0 \\ 0 & 0 & \sum T_x'^2 & 0 & 0 & \sum T_x'T_y' \\ 0 & 0 & 0 & 0 & 0 & 0 \\ 0 & 0 & 0 & 0 & 0 & 0 \\ 0 & 0 & \sum T_x'T_y' & 0 & 0 & \sum T_y'^2 \end{bmatrix}$$

In an example, it may be faster and more robust for the computer-implemented process to use a quasi-Gauss-Newton method, where the Hessian is approximated using the Broyden-Fletcher-Goldfarb-Shanno (BFGS) method. The BFGS method determines a matrix on every step by which the gradient vector is multiplied to go into a "better" direction. This approach can be combined with a line search algorithm to find the "best" value of a in the following iterative parameter update equation:

$$p^{i+1}=p^i+\alpha\Delta p$$

The computer-implemented process enables rapid registration of a captured image. In addition, the computer-implemented process can analyze the registered image to recover data, in an example only after the final accurate planar projection has been recovered. When desired, the final stage of accurate image registration can be achieved using a planar projection-based method. Satisfactory results are achieved using a similar gradient descent approach to that outlined here, except that all parameters of the planar projection (and not just the translation) can be updated at each iteration. It is appropriate to pre-filter the images using difference of Gaussian band-pass filters (e.g., with Gaussian filters of 3 and 6 pixel standard deviation for the mule image and scaled filters for the target captured image). Only the region of the target image, including the previously estimated location of the mule image (from the previously computed affine transform), and a small border around it is processed in this way.

Figure 6:
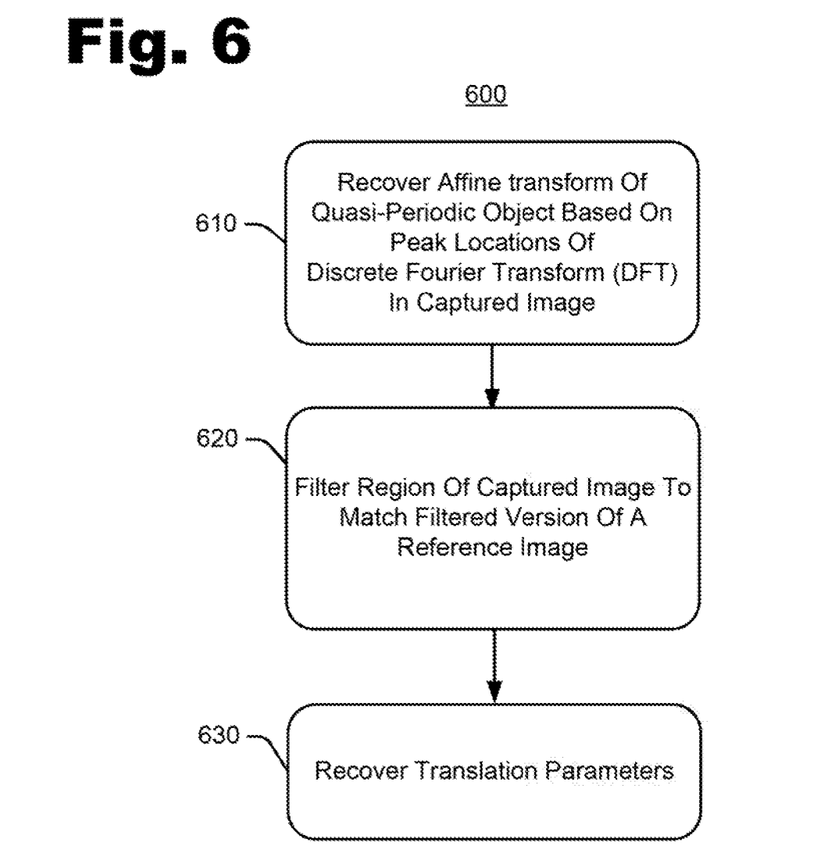
FIGS. 6 and 7 are flowcharts illustrating example operations which may be implemented to recover planar projections and correct perspective distortion in an image.
Figure 7:
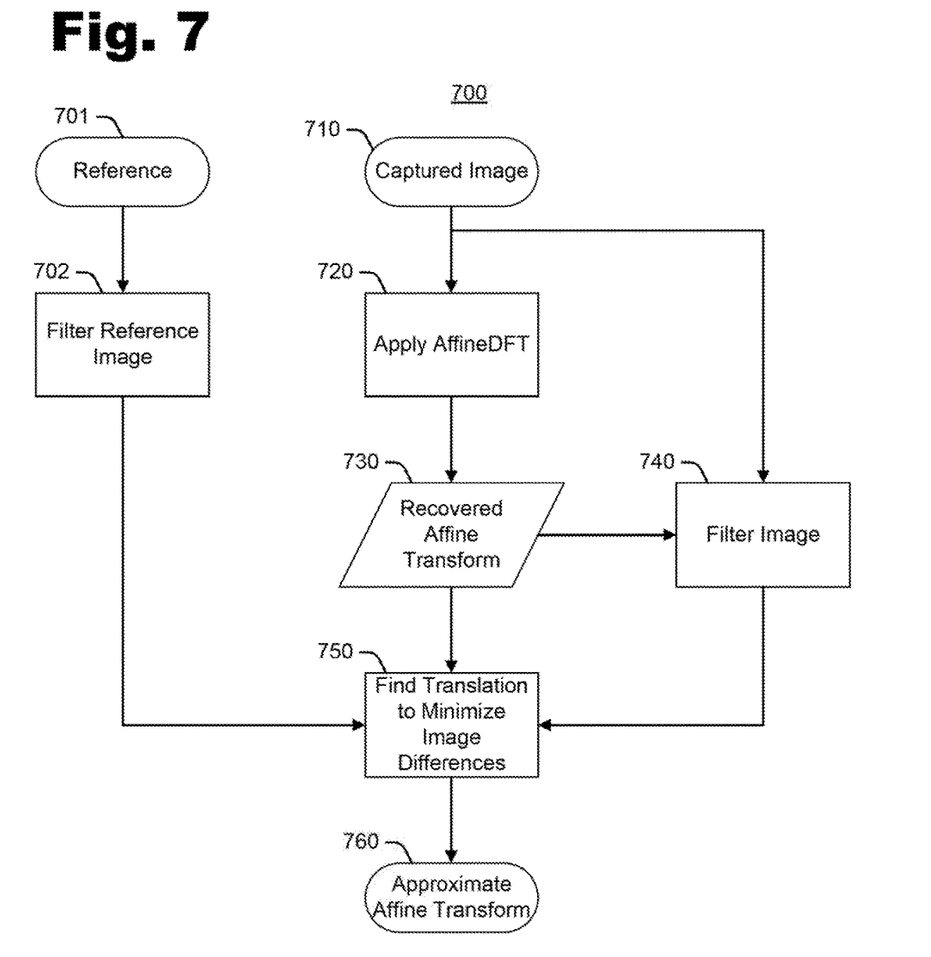

An example implementation of the approach described above is illustrated by the flowcharts in FIGS. 6 and 7. FIGS. 6 and 7 are flowcharts illustrating example operations which may be implemented to recover planar projections and correct perspective distortion in the image. The operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In FIG. 6, operations 600 illustrate a method of rapid image registration. Operation 610 includes recovering an affine transform of a quasi-periodic object based on peak locations of Discrete Fourier Transform (DFT) in a captured image.

Operation 620 includes filtering a region of the captured image to match a filtered version of a reference image including the quasi periodic object. In an example, only a fixed subset of the captured image is filtered. In an example, filtering is by low pass filter or a band pass filter. In an example, filtering is based on a scale recovered from the affine transform.

Operation 630 includes recovering translation parameters to reduce image differences between the reference image and the captured image for a subset of the image locations of the filtered image to output a registered image. In an example, recovering the translation parameters is using an affine transform. In an example, recovering the translation parameters is using an inverse of an affine transform.

In an example, further operations may include applying the affine transform to the reference image to give a scale value, a rotation value, and a skew value of the captured image. Further operations may also include transforming the subset of image locations to the filtered captured image and updating the subset of image locations to find the translation parameters to minimize image differences between the reference image and the captured image.

The operations shown and described herein are provided to illustrate example implementations. It is noted that the operations are not limited to the ordering shown. Still other operations may also be implemented.

Operations 700 are illustrated by way of example in FIG. 7. A reference image 701 is filtered at 702 (e.g., by a low pass filter). In operation 710, a target image is captured. In an example, the AffineDFT method described above is first applied to the captured image at operation 720 (e.g., to a central or region of the captured image), and the affine transform is recovered in operation 730. In operation 740, the captured image may be directly filtered using a filter determined from the scale parameter recovered from the affine transform. In operation 750, a translation is found which minimizes image differences. An approximate affine transform is output at 760.

In an example, the approximate affine transform can be input as a basis for a refined transform, and ultimately as output of a rectified image. The transform may also be used in other applications, including for example, tracking location of a stegatone in real time as part of the user interface, or for augmenting the user interface.

It is noted that the examples shown and described are provided for purposes of illustration and are not intended to be limiting. Still other examples are also contemplated.

The invention claimed is:

1. A method of rapid image registration, comprising:
    recovering an affine transform of a quasi-periodic object based on peak locations of Discrete Fourier Transform (DFT) in a captured image;
    filtering a region of the captured image to match a filtered version of a reference, image including the quasi periodic object;
    recovering translation parameters to reduce image differences between the reference image and the captured image for a subset of the image locations of the filtered image; and
    outputting an approximate transform including translation.

2. The method of claim 1, wherein the approximate transform including translation is input for determining a final accurate planar projection for rectifying an image.

3. The method of claim 1, wherein recovering the translation parameters is using one of the affine transform and an inverse of the affine transform.

4. The method of claim 1, further comprising applying an affine transform or an inverse transform to the captured image and recovering a remaining translation.

5. The method of claim 1, further comprising transforming the subset of image locations to the filtered captured image and updating the subset of image locations to find the translation parameters to minimize image differences between the reference image and the captured image.

6. The method of claim 5, wherein an inverse transform is applied.

7. The method of claim 1, further comprising identifying existence of a quasi-periodic object.

8. The method of claim 7, herein filtering is by one of a low pass filter and a band pass filter.

9. The method of claim 8, wherein filtering is based on a scale recovered from the affine transform.

10. A machine-readable not-transitory storage medium comprising instructions executable by a processor to:
    identify peak locations of Discrete Fourier Transform (DFT) of a quasi-periodic object in a captured image to obtain an affine transform;
    filter at least part of the captured image to match a filtered version of a reference image;
    reduce image differences between the reference image and the captured image for a subset of the image locations of the filtered image; and
    output, an approximate transform including translation.

11. The machine-readable non-transitory storage medium of claim 10, wherein the DFT recovers the affine directly from a pattern of the quasi periodic object.

12. The machine-readable non-transitory storage medium of claim 10, wherein the instructions are further executable by the processor to approximate a translation using gradient decent while keeping all other parameters fixed.

13. The machine-readable non-transitory storage medium of claim 10, wherein the instructions are further executable by the processor to recover a final high-accuracy transformation of the captured image.

14. A system having a processor executable to:
    identify peak locations of Discrete Fourier Transform (DFT) of a quasi-periodic object in a captured image to obtain an affine transform;
    filter at least part of the captured image to match a filtered version of a reference image;
    reduce image differences between the reference image and the captured image; and
    outputting an approximate transform including translation.

15. The system of claim 14, wherein the processor is further executable to:
    transform a subset of image locations to the filtered captured image, and
    update the subset of image locations to find the, translation parameters to minimize image differences between the reference image and the captured image.

* * * * *

UNITED STATES PATENT AND TRADEMARK OFFICE
CERTIFICATE OF CORRECTION

PATENT NO. : 10,002,438 B2  
APPLICATION NO. : 15/327959  
DATED : June 19, 2018  
INVENTOR(S) : Stephen Pollard et al.

Page 1 of 1

It is certified that error appears in the above-identified patent and that said Letters Patent is hereby corrected as shown below:

In the Drawings

In sheet 5 of 7, Fig. 5a, Line 4 approx., delete "CITZEN" and insert -- CITIZEN --, therefor.

In the Claims

In Column 11, Line 51, Claim 1, delete "reference," and insert -- reference --, therefor.

In Column 12, Line 17, Claim 8, delete "herein" and insert -- wherein --, therefor.

In Column 12, Line 21, Claim 10, delete "not-transitory" and insert -- non-transitory --, therefor.

In Column 12, Line 31 approx., Claim 10, delete "output," and insert -- output --, therefor.

In Column 12, Line 58, Claim 15, delete "the," and insert -- the --, therefor.

Signed and Sealed this  
Twenty-second Day of January, 2019

Andrei Iancu  
*Director of the United States Patent and Trademark Office*